United States Patent
Sato

(10) Patent No.: US 12,427,926 B2
(45) Date of Patent: Sep. 30, 2025

(54) REAR IMAGE DISPLAY APPARATUS

(71) Applicant: ALPS ALPINE CO., LTD., Tokyo (JP)

(72) Inventor: Tetsuo Sato, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/613,891

(22) Filed: Mar. 22, 2024

(65) Prior Publication Data
US 2024/0336199 A1    Oct. 10, 2024

(30) Foreign Application Priority Data
Apr. 4, 2023    (JP) ................ 2023-060515

(51) Int. Cl.
*B60R 1/26* (2022.01)
*B60R 11/02* (2006.01)

(52) U.S. Cl.
CPC ............ *B60R 1/26* (2022.01); *B60R 11/0229* (2013.01); *B60R 11/0264* (2013.01); *B60R 2300/50* (2013.01)

(58) Field of Classification Search
CPC ... B60R 1/26; B60R 11/0229; B60R 11/0264; B60R 2300/50; B60R 2300/30; H04N 7/183; G09G 2320/0626; G09G 2354/00; G09G 2320/0261; G09G 2320/0686; G09G 2356/00; G09G 5/10; G09G 2380/10
See application file for complete search history.

(56) References Cited

U.S. PATENT DOCUMENTS

| | | |
|---|---|---|
| 8,144,033 B2 | 3/2012 | Chinomi et al. |
| 2005/0253825 A1 | 11/2005 | Kawamura et al. |
| 2018/0301115 A1 | 10/2018 | Wang |
| 2024/0129638 A1* | 4/2024 | Takahashi .............. H04N 7/183 |

FOREIGN PATENT DOCUMENTS

| | | |
|---|---|---|
| EP | 1870878 | 12/2007 |
| JP | 2009-081664 | 4/2009 |

OTHER PUBLICATIONS

Extended European search report for EP24167226.0 mailed on May 15, 2024.

* cited by examiner

*Primary Examiner* — Farzana Hossain
(74) *Attorney, Agent, or Firm* — IPUSA, PLLC

(57) ABSTRACT

A rear image display apparatus is for displaying a captured rear image of a rear area behind a vehicle. The rear image display apparatus includes a processor; and a memory that includes instructions, which when executed, cause the processor to execute capturing the rear image of the rear area behind the vehicle; rendering the captured rear image, the rear image including an image of a central area and an image of a vicinity area on a left side and a right side of the central area; setting a brightness of the image of the vicinity area; and displaying the rendered rear image. The setting includes darkening the brightness of the image of the vicinity area.

3 Claims, 4 Drawing Sheets

REAR IMAGE DISPLAY APPARATUS

CROSS-REFERENCE TO RELATED APPLICATIONS

The present application is based on and claims priority to Japanese Patent Application No. 2023-060515, filed on Apr. 4, 2023, the entire contents of which are incorporated herein by reference.

BACKGROUND OF THE INVENTION

1. Field of the Invention

The present invention relates to a rear image display apparatus that displays a rear image captured by a camera on a display device in a vehicle compartment.

2. Description of the Related Art

Conventionally, there has been known a vehicle vicinity monitoring apparatus that displays images of a relatively wide area at the rear area of the vehicle and the side areas at the rear of the vehicle, while allowing the vehicle driver to identify the images with a correct sense of distance with regard to the images of the rear of the vehicle requiring special attention (see, e.g., Patent Document 1). By using this apparatus, it is possible to confirm a rear vehicle or the like in a wide area on the right and left sides, which is a blind spot of the rearview mirror, by displaying, on the display, images of a wider area than that of the rearview mirror which reflects the mirror reflection image.

RELATED-ART DOCUMENTS

Patent Documents

[Patent Document 1] Japanese Laid-Open Patent Publication No. 2009-81664

Incidentally, the display serving as an electronic mirror used instead of a rearview mirror in the vehicle vicinity monitoring apparatus and the like disclosed in the above-mentioned Patent Document 1, uses a liquid crystal display device, etc., and bright images are displayed by using a backlight, etc., so that the display contents are clear even in a dark car or at night, and excellent visibility can be obtained. However, on the other hand, when a white object, a glowing sign, a signboard, a tail lamp of an oncoming car, etc., enter the display area with a fast movement from the left and right ends of the display, the driver unconsciously and reflexively checks the fast movement due to the bright display, and there is a problem that fatigue increases when driving for a long time.

SUMMARY OF THE INVENTION

It is a general object of the described embodiments to provide a rear image display apparatus capable of reducing the driver's reflexive checking movement when a fast moving object enters the display from the surroundings, thereby reducing fatigue.

According to an embodiment, there is provided a rear image display apparatus for displaying a captured rear image of a rear area behind a vehicle, the rear image display apparatus including a processor; and a memory that includes instructions, which when executed, cause the processor to execute capturing the rear image of the rear area behind the vehicle; rendering the captured rear image, the rear image including an image of a central area and an image of a vicinity area on a left side and a right side of the central area; setting a brightness of the image of the vicinity area; and displaying the rendered rear image, wherein the setting includes darkening the brightness of the image of the vicinity area.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

Figure 1:
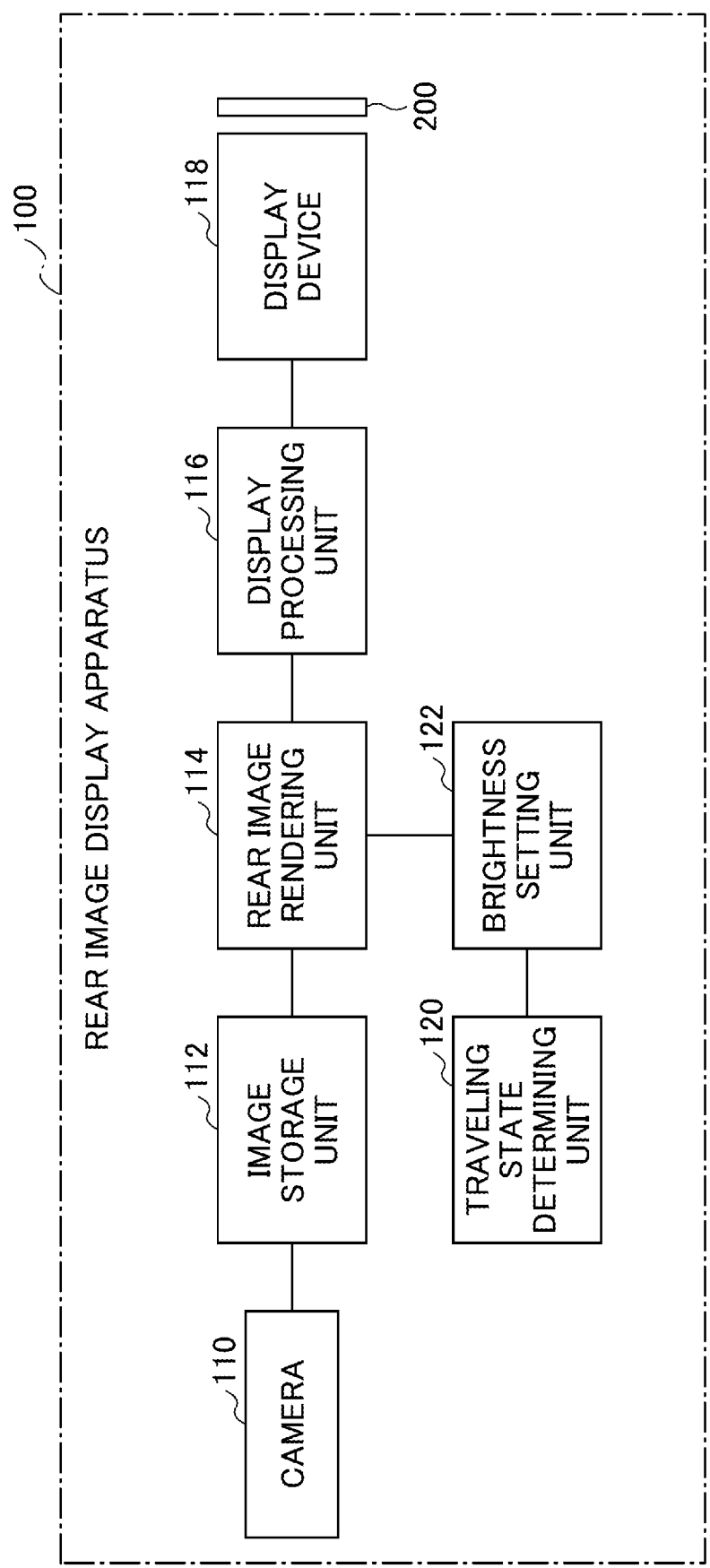
FIG. 1 is a diagram illustrating the configuration of a rear image display apparatus according to an embodiment.

According to an embodiment, there is provided a rear image display apparatus for displaying a captured rear image of a rear area behind a vehicle, the rear image display apparatus including an image capturing unit configured to capture the rear image of the rear area behind the vehicle; a rear image rendering unit configured to render the rear image captured by the image capturing unit, the rear image including an image of a central area and an image of a vicinity area on a left side and a right side of the central area; a brightness setting unit configured to set a brightness of the image of the vicinity area; and a display unit configured to display the rear image rendered by the rear image rendering unit, wherein the brightness setting unit darkens the brightness of the image of the vicinity area.

According to an embodiment, when a rear image is displayed on a display device, the brightness of the vicinity areas on the left and right of the central area is darkened, and even when white objects or shiny objects, which move quickly, enter the vicinity area, the visibility of these objects can be reduced, and, therefore it is possible to prevent the driver's reflexive checking action with respect to these objects, thereby reducing the feeling of fatigue.

Further, it is desirable to further provide a traveling state determination unit for determining the traveling state of a vehicle by which the movement of the image appearing in the vicinity area becomes fast, and the brightness setting unit makes the brightness of the vicinity area darker than the previous brightness when the traveling state determining unit determines that the movement is fast. Specifically, it is desirable that the traveling state by which the movement state determining unit determines that the movement is fast is when the traveling speed of the vehicle is greater than or equal to the first threshold. Furthermore, it is desirable that the traveling state by which the movement state determining unit determines that the movement is fast is when a steering angle is greater than or equal to a second threshold. In such a traveling state of the vehicle, the movement of an object entering the vicinity area in the rear image becomes particularly fast, and therefore, by darkening the vicinity area only in such a case, the visibility of the vicinity area in other situations can be enhanced.

Further, it is desirable that the brightness setting unit described above makes the brightness of the vicinity area darker as the traveling speed of the vehicle increases. By making the brightness of the vicinity area darker as the movement of the object entering the vicinity area of the rear image becomes faster, it is possible to increase the degree to which the driver's checking action is prevented as the object moves more quickly.

Further, it is desirable that the brightness setting unit described above makes the brightness of the vicinity area darker as the position is further away from the central area. The visibility at the moment when the object enters the vicinity area in the rear image can be particularly reduced, and, therefore it is possible to prevent the driver's checking action that occurs at the moment when the object enters.

Hereinafter, a rear image display apparatus according to an embodiment to which the present invention is applied will be described with reference to the drawings.

FIG. 1 is a diagram illustrating a configuration of a rear image display apparatus according to an embodiment. As illustrated in FIG. 1, a rear image display apparatus 100 according to the embodiment includes a camera 110, an image storage unit 112, a rear image rendering unit 114, a display processing unit 116, a display device 118, a traveling state determining unit 120, a brightness setting unit 122, and a rearview mirror 200. By using the rear image display apparatus 100, for example, a function as a class 1 electronic mirror can be implemented.

The camera 110 is mounted at a predetermined position at the rear of the vehicle (for example, the upper part of the rear glass window or the upper part of the license plate), to capture an image of a predetermined range at the rear of the vehicle. The image capturing range is set to be wider than the range at the rear of the vehicle that can be viewed through a conventional rearview mirror having a mirror surface. The image (rear image) captured by the camera 110 is stored in the image storage unit 112.

The rear image rendering unit 114 reads the image stored in the image storage unit 112 and renders a rear image for display. The display processing unit 116 displays the rear image rendered by the rear image rendering unit 114 on the screen of the display device 118. The display device 118 is configured by using, for example, a high brightness liquid crystal display (LCD).

The rearview mirror 200 is mounted on the upper part of the windshield in the middle of the driver's seat and the passenger's seat of the vehicle. The rearview mirror 200 is provided with a display screen of the display device 118 described above on the reverse side, so that when an image is displayed on the display screen, the displayed image is visible to the driver through the mirror surface. The present embodiment has a feature in the display mode of the rear image in the display device 118, and for the explanation of this feature, the rearview mirror 200 having a mirror surface is not necessarily required, and the screen of the display device 118 may be directly visible.

Figure 2:
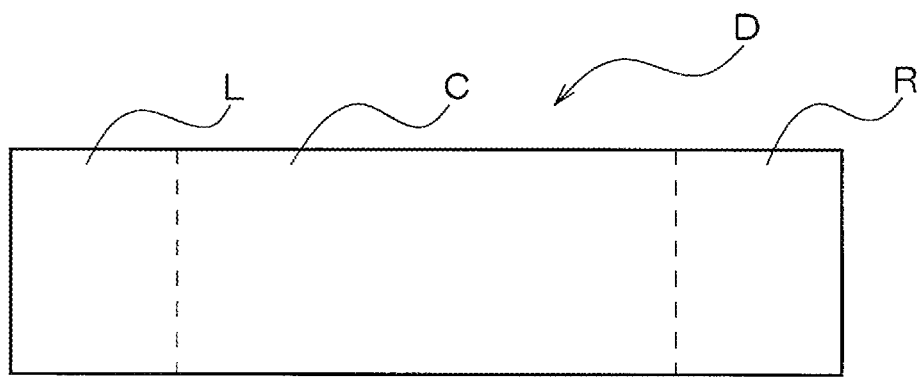
FIG. 2 is an explanatory diagram of a plurality of areas constituting a rear image displayed on a display device.

FIG. 2 is an explanatory diagram of a plurality of regions constituting the rear image displayed on the display device 118. As illustrated in FIG. 2, a rear image D displayed on the display device 118 includes a central area C and left and right vicinity areas L and R on the left and right sides of the central area C. The central area C corresponds to a range of the rear of the vehicle, for example, that can be seen through a conventional rearview mirror (a rearview mirror which is not provided with a display device or the like and which functions only to reflect the background behind the vehicle). Further, the vicinity area L on the left side of the central area C and the vicinity area R on the right side correspond to a range that includes a background at the rear of the vehicle that deviates to the left and right from the range of the central area C.

The traveling state determining unit 120 determines the traveling state of the vehicle by which the movement of the image (object) appearing in the vicinity areas L and R becomes faster. Specifically, it is considered that the traveling state at which it is determined that the movement of the image is faster is when the traveling speed of the vehicle is greater than or equal to a first threshold. The faster the traveling speed of the vehicle, the faster the movement of an object entering the vicinity areas L and R. The detection of the traveling speed may be performed by counting the vehicle speed pulse output every time the vehicle travels a certain distance, or by acquiring the speed information via a communication line from a vehicle control device or the like. The speed may be detected based on the output of an acceleration sensor.

The brightness setting unit 122 makes the brightness of the vicinity areas L and R included in the rear image darker than the brightness of a previous image (when the speed of the vehicle is slower than the first threshold), when the traveling state determining unit 120 determines that the movement is fast (when the speed of the vehicle becomes greater than or equal to the first threshold).

In the present embodiment, when the brightness of the image is darkened, it is desirable to reduce the brightness of the vicinity areas L and R while maintaining the color. Thus, one approach is to reduce the gradation of each pixel included in the vicinity areas L and R. For example, in the case where each pixel is expressed by a gradation of a predetermined number of bits of RGB, each gradation of RGB may be reduced by the same ratio (for example, multiply each gradation by 0.5).

The determination operation for reducing the brightness of the vicinity areas L and R is performed by the brightness setting unit 122, and the processing for changing the gradation of each pixel may be performed by the rear image rendering unit 114 or by the brightness setting unit 122.

The camera 110 corresponds to an image capturing unit, the rear image rendering unit 114 corresponds to a rear image rendering unit, the brightness setting unit 122 corresponds to a brightness setting unit, the display processing unit 116 and the display device 118 correspond to a display device, and the traveling state determining unit 120 corresponds to a traveling state determining unit.

Thus, in the rear image display apparatus 100 of the present embodiment, when the rear image is displayed on the display device 118, the brightness of the vicinity areas L and R on the left and right sides of the central area C is darkened, and even when a white object or a shiny object that is moving quickly enters the vicinity areas L and R from the vicinity of the vicinity areas L and R, the visibility of these objects can be reduced, thereby preventing the driver's reflexive checking action with respect to these objects and reducing the feeling of fatigue.

In particular, the brightness of the vicinity areas L and R is darkened when the vehicle is in a traveling state by which the movement of the image (object) appearing in the vicinity areas L and R becomes fast, specifically, when the vehicle is traveling at a high traveling speed (when the traveling speed is greater than or equal to the first threshold). In such a traveling state of the vehicle, the speed of the movement of the object entering the vicinity areas L and R increases, and, therefore, by darkening the vicinity areas L and R only in such a case, the vicinity areas L and R can be brightened in other situations so that the visibility of the objects can be enhanced.

Incidentally, in the above-described embodiment, a case where the brightness of the vicinity areas L and R of the rear image is darkened at once has been described, but the brightness of the vicinity areas L and R may be darkened as the traveling speed of the vehicle becomes higher.

Figure 3A:
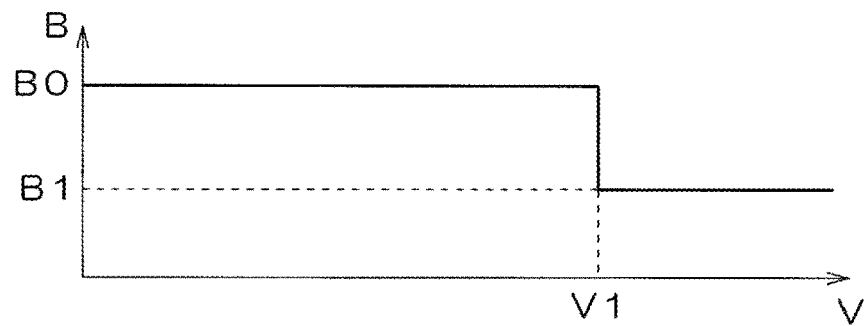
FIGS. 3A to 3C are diagrams illustrating an example of setting the brightness when reducing the brightness of the vicinity areas L and R in association with the travelling speed.
Figure 3B:
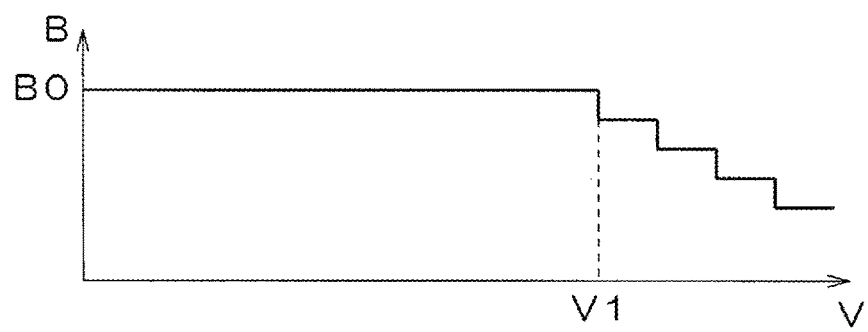
Figure 3C:
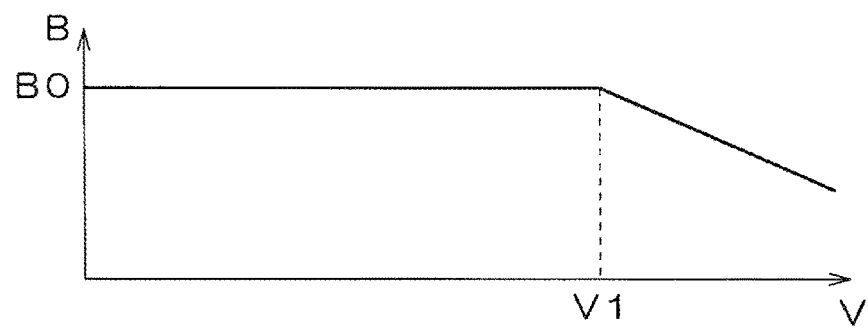

FIGS. 3A, 3B, and 3B are diagrams illustrating an example of setting the brightness when the brightness of the vicinity areas L and R is reduced in association with the traveling speed. In FIGS. 3A, 3B, and 3B, the horizontal axis indicates the traveling speed V of the vehicle, and the vertical axis indicates the brightness B. FIG. 3A illustrates a case where the brightness B is reduced at once from B0 to B1 when the traveling speed V is greater than or equal to the first threshold V1. FIG. 3B illustrates a case where the brightness B is reduced from B0 in a stepwise manner so as to be inversely proportional to the traveling speed V when the traveling speed V is greater than or equal to the first threshold V1. FIG. 3C illustrates a case where the brightness B is continuously reduced from B0 so as to be inversely proportional to the traveling speed V when the traveling speed V is greater than or equal to the first threshold V1.

In this way, by varying the brightness of the vicinity areas L and R in accordance with the traveling speed V, the brightness of the vicinity areas L and R can be darkened as the movement of the object entering the vicinity areas L and R becomes faster in accordance with the traveling speed, and the degree to which the driver's checking action is prevented can be increased as the object moves faster.

In the above-described embodiment, the brightness of the entire vicinity areas L and R in the rear image is darkened, but these areas may be darkened as the object moves further away from the central area C.

Figure 4A:
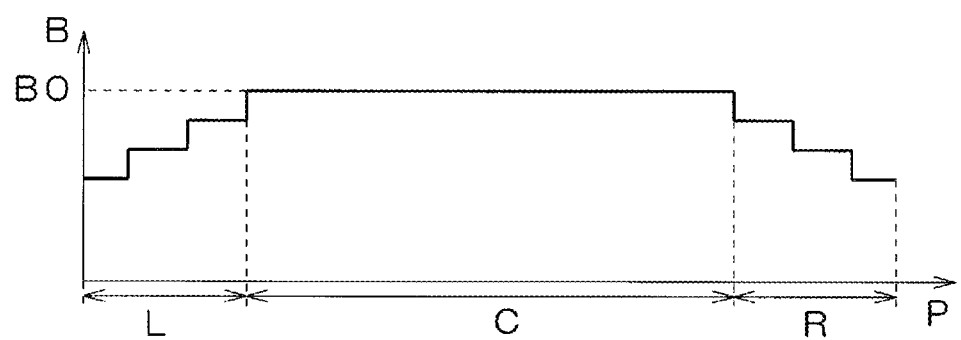
FIGS. 4A and 4B are diagrams illustrating an example of setting the brightness when reducing the brightness of the vicinity areas L and R according to the positional relationship between the central area C and the vicinity areas L and R.
Figure 4B:
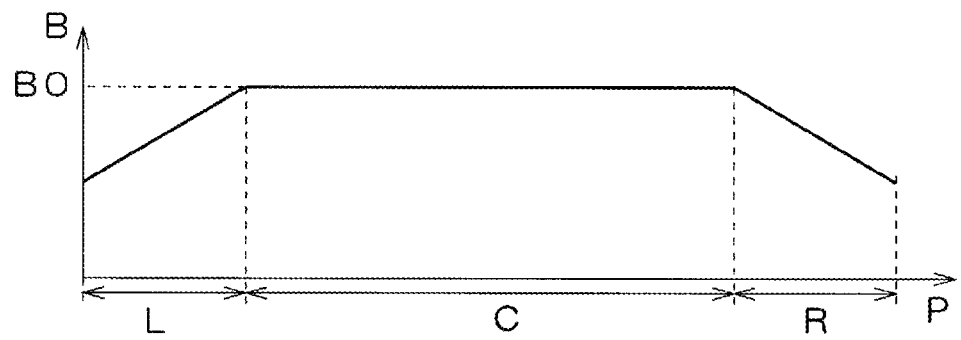

FIGS. 4A and 4B are diagrams illustrating an example of setting the brightness when the brightness of the vicinity areas L and R is reduced according to the positional relationship between the central area C and the vicinity areas L and R. In FIGS. 4A and 4B, the horizontal axis indicates the position P in the rear image, and the vertical axis indicates the brightness B. FIG. 4A illustrates a case in which the brightness B of the vicinity areas L and R is reduced from B0 in a stepwise manner as the position becomes further away from the central area C (as the position becomes closer to the left and right edges). FIG. 4B illustrates a case in which the brightness B of the vicinity areas L and R is continuously reduced from B0 as the position becomes further away from the central area C.

In this way, by making the brightness of the vicinity areas L and R darker as the position becomes further away from the central area C, the visibility at the moment when the object enters the vicinity areas L and R in the rear image can be particularly reduced, and therefore, the driver's checking action occurring at the moment when the object enters can be prevented.

The present invention is not limited to the above embodiments, and various modifications can be performed within the scope of the gist of the present invention. In the above embodiment, the traveling state of the vehicle by which the movement of the image (object) appearing in the vicinity areas L and R becomes faster is determined based on the traveling speed of the vehicle. However, it may be determined that, when the traveling speed of the vehicle is greater than or equal to the first threshold and a steering angle is greater than or equal to a second threshold, the vehicle is in the traveling state at which the movement of the image (object) appearing in the vicinity areas L and R becomes faster. Even when the steering wheel is turned significantly, by darkening the brightness of the vicinity areas L and R in the rear image, it is possible to prevent the driver's reflexive checking action with respect to the object entering from the vicinity in these areas, thereby reducing the feeling of fatigue.

INDUSTRIAL AVAILABILITY

As described above, according to the present invention, when the rear image is displayed on the display device, the brightness of the left and right vicinity areas on the left and right of the central area is darkened, and even when white objects or shiny objects, which move quickly, enter the vicinity area, the visibility of these objects can be reduced, and, therefore it is possible to prevent the driver's reflexive checking action with respect to these objects, thereby reducing the feeling of fatigue.

What is claimed is:

1. A rear image display apparatus for displaying a rear image of a rear area behind a vehicle, the rear image display apparatus comprising:
 a processor; and
 a memory that includes instructions, which when executed, cause the processor to execute:
 capturing the rear image of the rear area behind the vehicle;
 rendering the rear image, the rear image including an image of a central area, a vicinity area on a left side of the central area, and a vicinity area on a right side of the central area;
 setting a brightness of the image of the vicinity areas;
 displaying the rendered rear image;
 determining whether a travelling state of the vehicle is greater than or equal to a first threshold; and
 determining whether a steering angle of the vehicle is greater than or equal to a second threshold, wherein
 the setting includes darkening the brightness of the image of the vicinity areas more than a previous brightness of the image of the vicinity areas in response to determining that the travelling state is greater than or equal to the first threshold, and
 the setting includes darkening the brightness of the image of the vicinity areas more than the previous brightness of the image of the vicinity areas in response to determining that the steering angle is greater than or equal to the second threshold.

2. The rear image display apparatus according to claim 1, wherein the setting includes darkening the brightness of the vicinity areas as the traveling speed of the vehicle increases.

3. The rear image display apparatus according to claim 1, wherein the setting includes darkening the brightness of the vicinity areas as a position in the vicinity areas becomes further away from the central area.

* * * * *